(12) United States Patent
Yamamoto

(10) Patent No.: US 11,385,531 B2
(45) Date of Patent: Jul. 12, 2022

(54) PROJECTOR AND ADAPTER UNIT

(71) Applicant: Panasonic Intellectual Property Management Co., Ltd., Osaka (JP)

(72) Inventor: Norikazu Yamamoto, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/092,931

(22) Filed: Nov. 9, 2020

(65) Prior Publication Data

US 2021/0149284 A1 May 20, 2021

(30) Foreign Application Priority Data

Nov. 19, 2019 (JP) .............................. JP2019-208972

(51) Int. Cl.
| | |
|---|---|
| *G02B 7/14* | (2021.01) |
| *G03B 21/14* | (2006.01) |
| *G03B 21/00* | (2006.01) |
| *G02B 7/02* | (2021.01) |

(52) U.S. Cl.
CPC ........... *G03B 21/142* (2013.01); *G02B 7/021* (2013.01); *G03B 21/008* (2013.01)

(58) Field of Classification Search
CPC .......... G02B 7/021; G02B 7/023; G02B 7/14; G03B 21/142
See application file for complete search history.

(56) References Cited

U.S. PATENT DOCUMENTS

| | | |
|---|---|---|
| 2004/0046940 A1 | 3/2004 | Yanagisawa |
| 2011/0181838 A1 | 7/2011 | Yokoyama et al. |
| 2011/0249154 A1 | 10/2011 | Kawase et al. |
| 2016/0295082 A1 | 10/2016 | Iinuma |
| 2018/0348612 A1 | 12/2018 | Nakajima et al. |
| 2019/0018311 A1 | 1/2019 | Yamamoto |

FOREIGN PATENT DOCUMENTS

| | | |
|---|---|---|
| JP | 2004-70116 | 3/2004 |
| JP | 2011-150159 | 8/2011 |
| JP | 2011-158657 | 8/2011 |
| JP | 2011-223217 | 11/2011 |
| JP | 2016-191835 | 11/2016 |
| JP | 2018-205462 | 12/2018 |
| JP | 2019-20439 | 2/2019 |
| WO | 2017/130924 | 8/2017 |

*Primary Examiner* — Ryan D Howard
(74) *Attorney, Agent, or Firm* — Wenderoth, Lind & Ponack L.L.P.

(57) ABSTRACT

A projector of the present disclosure includes an image former, a mounter, a second projection lens unit, an adapter, and a back focal length-adjusting spacer. The image former forms and emits image light. The mounter detachably connects to a first projection lens unit including a first projection lens which the image light emitted from the image former enters. The second projection lens unit includes a second projection lens having a back focal length to an emission surface of the image former that is different from a back focal length of the first projection lens. The adapter is detachably connectable to the mounter and detachably retaining the second projection lens unit. The back focal length-adjusting spacer is disposed on the adapter and interposed between the second projection lens and the emission surface of the image former when the second projection lens unit is connected to the mounter via the adapter.

6 Claims, 13 Drawing Sheets

PROJECTOR AND ADAPTER UNIT

BACKGROUND

1. Technical Field

The present disclosure relates to a projector in which a projection lens is interchangeable and to an adapter unit that is usable for the projector.

2. Description of the Related Art

Patent Literature (PTL) 1 discloses a projector that is primarily used for professional uses. In order to accommodate various needs, a projector of this kind is configured so that a plurality of types of projection lens units (each unit including a projection lens) can be mounted to the projector.

PTL 1 is Japanese Patent Unexamined Publication No. 2018-205462.

SUMMARY

It is often the case that a projection lens unit for a certain projector is desired to be used for another projector with a different specification. For example, it is often the case that a projection lens unit for an earlier model projector is desired to be effectively utilized for a latest model projector. However, it is sometimes the case that the latest model projector is not compatible with the projection lens unit for the earlier model projector. More specifically, the projection lens unit for the latest model projector may have a back focal length different from the back focal length of the projection lens unit for the earlier model projector.

In view of such a problem, an object of the present disclosure is to allow projection lens units having different back focal lengths to be usable in a projector in which a projection lens unit is interchangeable.

In order to solve the foregoing and other problems, an embodiment of the present disclosure provides a projector including:

an image former forming and emitting image light;

a mounter detachably connecting to a first projection lens unit including a first projection lens which the image light emitted from the image former enters;

a second projection lens unit including a second projection lens having a back focal length to an emission surface of the image former that is different from a back focal length of the first projection lens;

an adapter being detachably connectable to the mounter and detachably retaining the second projection lens unit; and a back focal length-adjusting spacer disposed on the adapter and interposed between the second projection lens and the emission surface of the image former when the second projection lens unit is connected to the mounter via the adapter.

Another embodiment of the present disclosure provides an adapter unit for connecting a second projection lens unit to a projector, the projector including an image former forming and emitting image light and a mounter detachably connecting to a first projection lens unit including a first projection lens which the image light emitted from the image former enters, and the second projection lens unit including a second projection lens having a back focal length to an emission surface of the image former that is different from a back focal length of the first projection lens, the adapter unit including:

an adapter being detachably connectable to the mounter and detachably retaining the second projection lens unit; and a back focal length-adjusting spacer interposed between the second projection lens and the emission surface of the image former when the second projection lens unit is connected to the mounter via the adapter.

The present disclosure allows projection lens units having different back focal lengths to be usable in a projector in which a projection lens is interchangeable.

DETAILED DESCRIPTION

Figure 1:
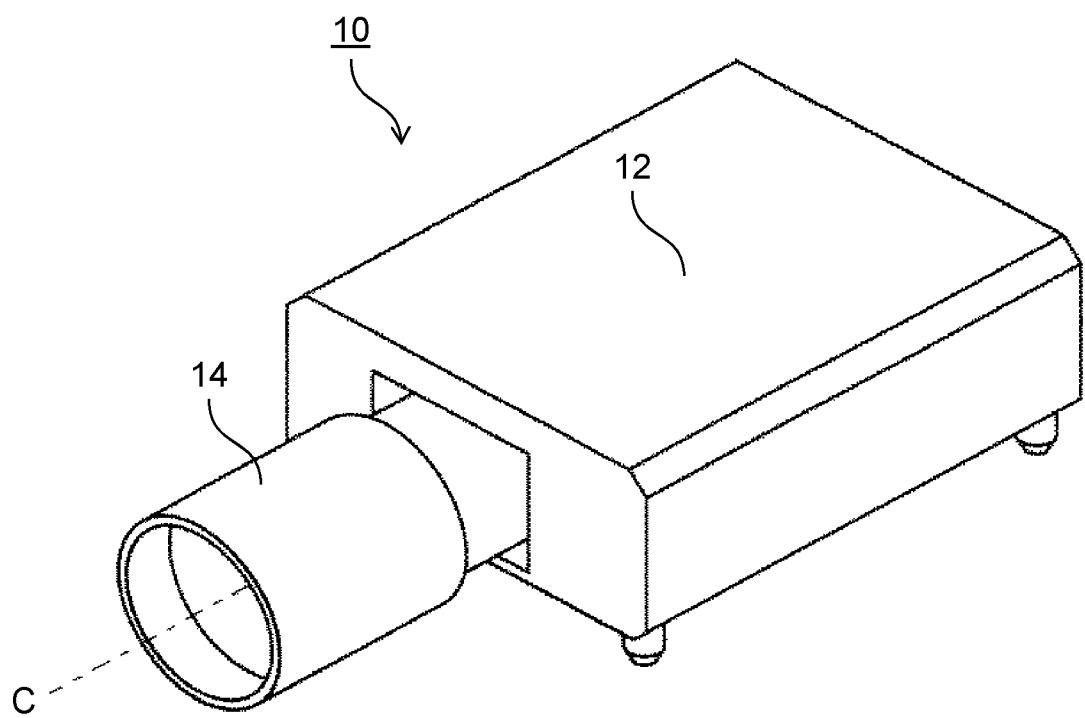
FIG. 1 is a schematic perspective view illustrating a projector according to a first exemplary embodiment of the present disclosure.

A projector according to an embodiment of the present disclosure includes: an image former forming and emitting image light; a mounter detachably connecting to a first projection lens unit including a first projection lens which the image light emitted from the image former enters; a second projection lens unit including a second projection lens having a back focal length to an emission surface of the image former that is different from a back focal length of the first projection lens; an adapter being detachably connectable to the mounter and detachably retaining the second projection lens unit; and a back focal length-adjusting spacer disposed on the adapter and interposed between the second projection lens and the emission surface of the image former when the second projection lens unit is connected to the mounter via the adapter.

Such an embodiment allows projection lens units having different back focal lengths to be usable in a projector in which a projection lens is interchangeable.

The back focal length-adjusting spacer may be an optical element, for example.

The optical element may include a flat glass, a lens, or a group of lenses, for example.

The mounter may include an electrical contact, and the second projection lens unit may include an electrical contact, for example. In this case, the adapter may include a conductor that electrically connects the electrical contact of the mounter and the electrical contact of the second projection lens unit.

The adapter may include, for example, a base connectable to the mounter and a lens unit holder retaining the second projection lens unit. The lens unit holder may be connected to the base so as to be movable back and forth relative to the base along a direction of projection of the second projection lens unit.

The image former may include, for example, a light source and a digital micromirror device including a plurality of micromirrors selectively reflecting light from the light source in a first direction or in a second direction. In this case, the back focal length-adjusting spacer may be a total internal reflection prism, and the total internal reflection prism may include a reflection surface such that a part of the light reflected by each of the plurality of micromirrors in the first direction is transmitted toward the second projection lens of the second projection lens unit and another part of the light reflected by each of the plurality of micromirrors in the second direction is reflected in a direction such as not to enter the second projection lens of the second projection lens unit.

Another embodiment of the present disclosure provides an adapter unit for connecting a second projection lens unit to a projector, the projector including an image former forming and emitting image light and a mounter detachably connecting to a first projection lens unit including a first projection lens which the image light emitted from the image former enters, and the second projection lens unit including a second projection lens having a back focal length to the emission surface of the image former that is different from a back focal length of the first projection lens, the adapter unit including: an adapter being detachably connectable to the mounter and detachably retaining the second projection lens unit; and a back focal length-adjusting spacer interposed between the second projection lens and the emission surface of the image former when the second projection lens unit is connected to the mounter via the adapter.

Such an embodiment allows projection lens units having different back focal lengths to be usable in a projector in which a projection lens is interchangeable.

Hereafter, exemplary embodiments of the present disclosure will be described with reference to the drawings.

First Exemplary Embodiment

Figure 2:
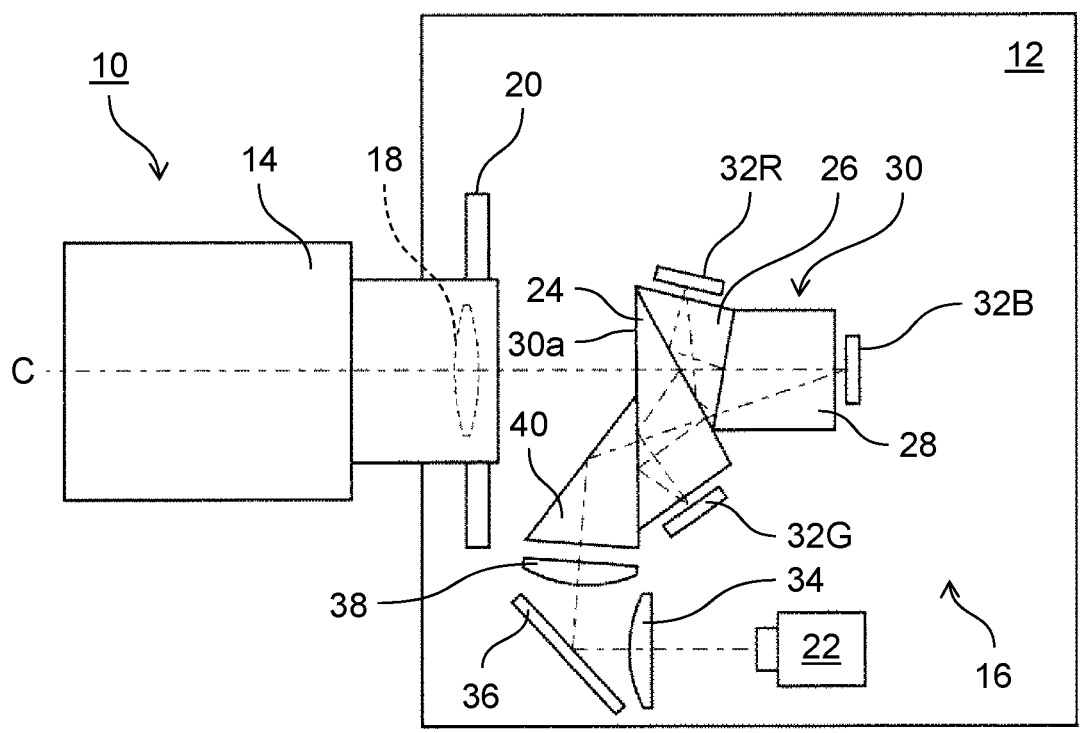
FIG. 2 is a schematic configuration view illustrating the projector.

FIG. 1 is a perspective view schematically illustrating a projector according to an exemplary embodiment of the present disclosure. FIG. 2 is a schematic configuration view illustrating the projector.

As illustrated in FIGS. 1 and 2, projector 10 includes housing 12, projection lens unit 14 detachably mounted to housing 12, and image former 16 that forms image light and emits the image light.

Housing 12 of projector 10 is in a rectangular parallelepiped shape and is made of a metal material, for example.

Projection lens unit 14 is a unit that projects image light onto a screen, for example, and includes a lens barrel and projection lens 18 disposed inside the lens barrel. In the case of the present exemplary embodiment, projection lens 18 includes a plurality of lenses. Instead, projection lens 18 may be composed of a single lens. In the drawings appended to the present specification, the projection lens is represented by only the one that is closest to the image former (i.e., the so-called rear lens element), and the other lenses are not depicted. Projection lens unit 14 is configured to be detachably connectable to mounter 20, which is provided on housing 12. Examples of the method of detachably connecting projection lens unit 14 and mounter 20 include a bayonet mount and a screw-threaded mount.

Image former 16 is accommodated in housing 12. Image former 16 is configured to form image light and emit the image light toward projection lens 18 of the projection lens unit 14. In the case of the first exemplary embodiment, projector 10 is a projector that operates in a so-called digital light processing (DLP: registered trademark) system. Accordingly, image former 16 includes illumination light source unit 22 (i.e., light source), prism assembly 30 including three prisms 24, 26, and 28, and three digital micromirror devices (DMD) 32R, 32G, and 32B.

Illumination light source unit 22 is an illumination light source that emits substantially homogeneous white light.

Prism assembly 30 is configured to reflect light components with specific wavelengths (i.e., specific colors) at the interfaces between prisms 24, 26, and 28. Thereby, prism assembly 30 splits white light into red, green, and blue light components. Also, prism assembly 30 is configured to combine modulated light (image light) that is reflected from digital micromirror devices 32R, 32G, and 32B and emit the modulated light from emission surface 30a.

Each of digital micromirror devices 32R, 32G, and 32B is a device that includes a plurality of micromirrors selectively reflecting light in a first direction or in a second direction. Note that the details of the first and second directions will be described later. By such digital micromirror devices 32R, 32G, and 32B, respective color light that is emitted from prism assembly 30 is modulated, and the modulated light (image light) is reflected toward prism assembly 30.

Such image former 16 allows the white light that is emitted from illumination light source unit 22 to enter prism assembly 30 through lens 34, mirror 36, lens 38, and prism 40. The light that has entered prism assembly 30 is split into red, green, and blue light components, and the split light components propagate through prism assembly 30 toward corresponding ones of digital micromirror devices 32R, 32G, and 32B. The split light components are modulated by the corresponding ones of digital micromirror devices 32R, 32G, and 32B and reflected as image light components of respective colors. The image light components of respective colors are then combined by prism assembly 30, and the combined image light is emitted from emission surface 30a of prism assembly 30 toward projection lens unit 14. Then, the image light is projected by projection lens unit 14 onto a screen, for example.

Hereinabove, the outline of projector 10 has been discussed. The following describes interchange of projection lens units, which is a main subject of the present disclosure.

In the case of the present first exemplary embodiment, projector 10 is configured to be connectable with a plurality of projection lens units having different specifications.

Figure 3:
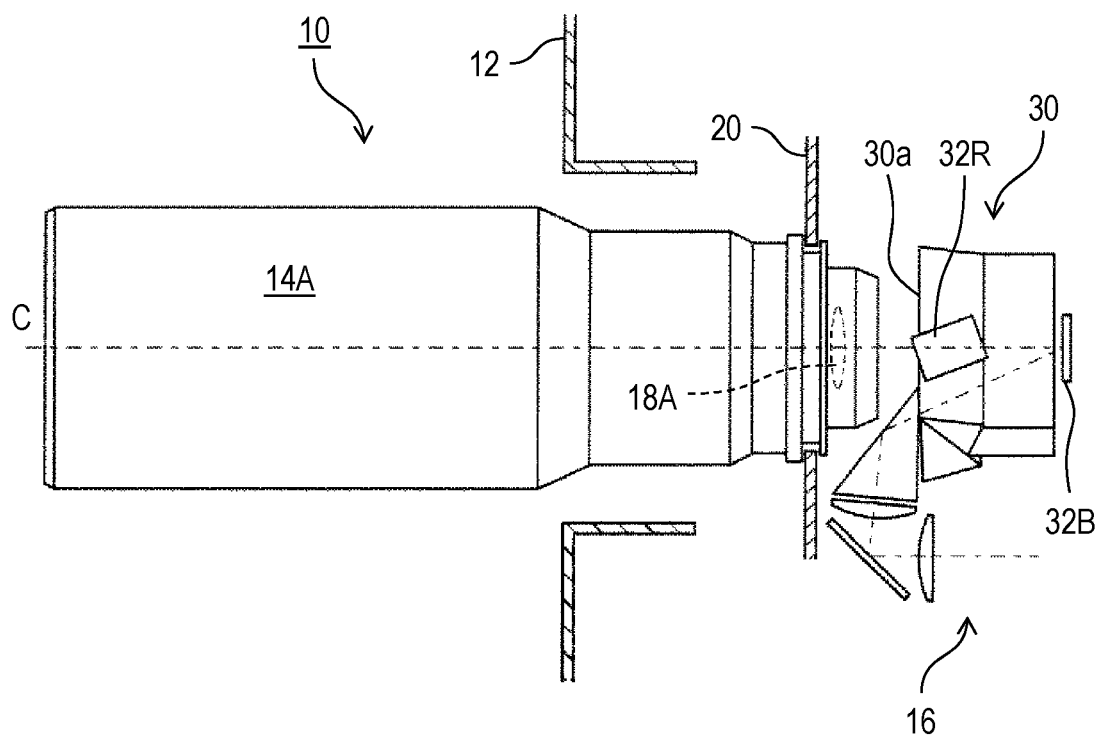
FIG. 3 is a view illustrating a portion of the projector to which a first projection lens unit is connected.
Figure 4:
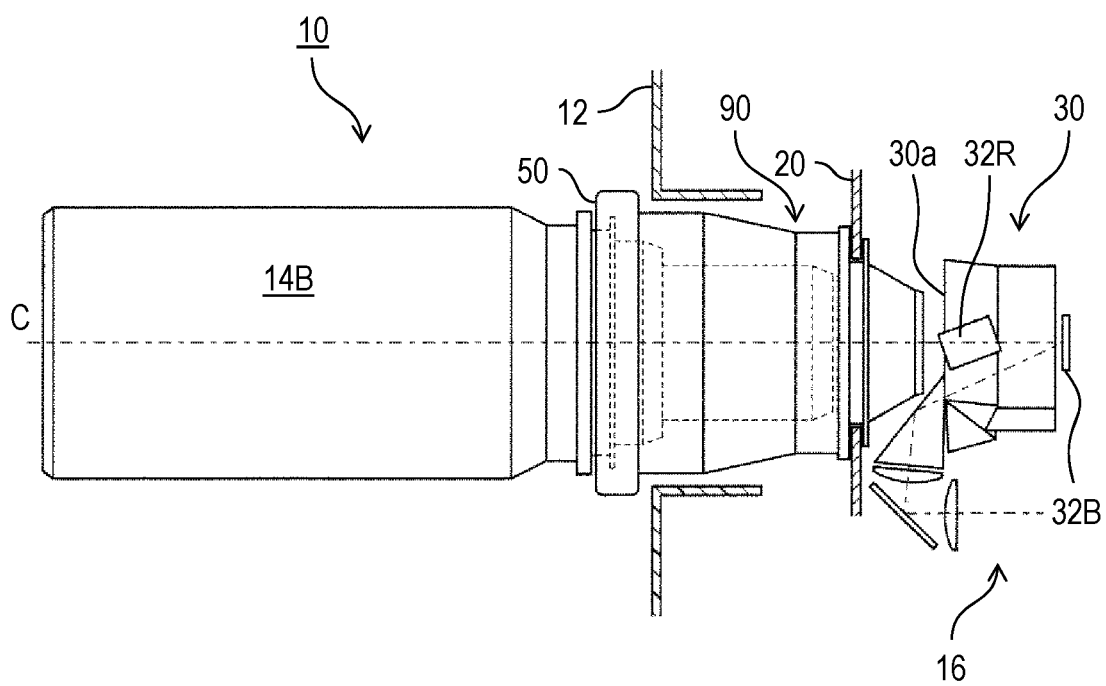
FIG. 4 is a view illustrating a portion of the projector to which a second projection lens unit is connected.

FIG. 3 is a view illustrating a portion of the projector to which a first projection lens unit is mounted. FIG. 4 is a view illustrating a portion of the projector to which a second projection lens unit is mounted.

As illustrated in FIGS. 3 and 4, projector 10, specifically, mounter 20 thereof, is configured to be detachably connectable to first projection lens unit 14A and second projection lens unit 14B having different specifications.

In the case of the present first exemplary embodiment, projector 10 is equipped with first projection lens unit 14A as standard equipment. Accordingly, first projection lens unit 14A is directly connectable with mounter 20, as illustrated in FIG. 3. That is, projector 10 is a projector that includes an optical system that is optically designed for first projection lens unit 14A.

On the other hand, second projection lens unit 14B is a projection lens unit that is used for optional equipment of projector 10 or another type of projector. For this reason, second projection lens unit 14B is indirectly connected with mounter 20 via adapter 50, as illustrated in FIG. 4. The details of this adapter 50 will be discussed below.

Figure 5:
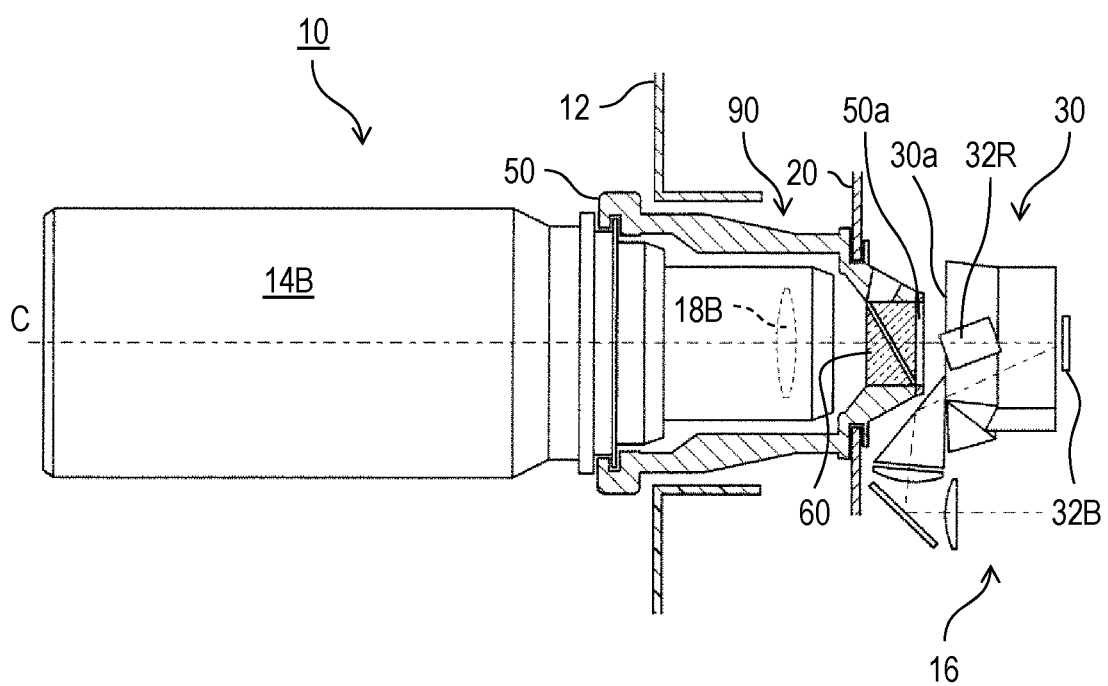
FIG. 5 is a view illustrating a portion of the projector to which the second projection lens unit is connected, which shows a cross section of an adapter unit.

FIG. 5 is a view illustrating a portion of the projector to which a second projection lens unit is connected, which shows a cross section of the adapter.

As illustrated in FIG. 5, adapter 50 is a cylindrical-shaped member that is fitted to a base end (an end thereof that faces image former 16) of second projection lens unit 14B. Adapter 50 includes, at its bottom end, aperture 50a through which image light emanating from image former 16 passes. Also, adapter 50 is configured to detachably retain second projection lens unit 14B. Moreover, adapter 50 is configured to be detachably connectable to mounter 20. The method of connecting adapter 50 and mounter 20 is identical to the method of connecting first projection lens unit 14A and mounter 20, examples of which include a bayonet mount and a screw-threaded mount.

As described previously, first projection lens unit 14A and second projection lens unit 14B have different specifications. In the case of the present first exemplary embodiment, the projection lenses to which image light enters from image former 16 (i.e., first projection lens 18A and second projection lens 18B) have different specifications. Specifically, first projection lens 18A and second projection lens 18B (the rear lens elements thereof) are different in the required back focal length, that is, the in-air converted distance to emission surface 30a of prism assembly 30.

As described previously, first projection lens unit 14A is a piece of standard equipment of projector 10. Therefore, merely connecting first projection lens unit 14A to mounter 20 allows first projection lens 18A (specifically the rear lens element thereof) to have a necessary back focal length relative to emission surface 30a of prism assembly 30.

On the other hand, even when second projection lens unit 14B is connected to mounter 20 via adapter 50, second projection lens 18B (specifically the rear lens element thereof) is unable to have a necessary back focal length relative to emission surface 30a of prism assembly 30 in the present first exemplary embodiment. For that reason, back focal length-adjusting spacer 60 for adjusting the back focal length of second projection lens 18B is provided on adapter 50. Adapter 50 and back focal length-adjusting spacer 60 together constitute adapter unit 90.

Specifically, in the case of the present first exemplary embodiment, back focal length-adjusting spacer 60 is an optical element, more specifically, a total internal reflection (TIR) prism, as illustrated in FIG. 5. The TIR prism is composed of two triangular prisms arranged such that their slant surfaces face each other across an air gap.

As illustrated in FIG. 5, back focal length-adjusting spacer 60 is disposed on adapter 50 so as to be interposed between second projection lens 18B of second projection lens unit 14B and emission surface 30a of prism assembly 30. The thickness of back focal length-adjusting spacer 60 (i.e., its size along the extending direction of optical axis C) is set to a thickness such as to be capable of adjusting the back focal length of second projection lens 18B relative to emission surface 30a of prism assembly 30 to a required back focal length.

Because such back focal length-adjusting spacer 60 is provided on adapter 50, second projection lens unit 14B can be used also for projector 10 that is optically designed for first projection lens unit 14A. In other words, because second projection lens unit 14B is not provided with back focal length-adjusting spacer 60, second projection lens unit 14B can also be used as it is for another type of projector (for example, for a projector that is optically designed for second projection lens unit 14B).

In the case of the present first exemplary embodiment, back focal length-adjusting spacer 60 is a TIR prism, as described previously. The reason will be described in the following.

Figure 6:
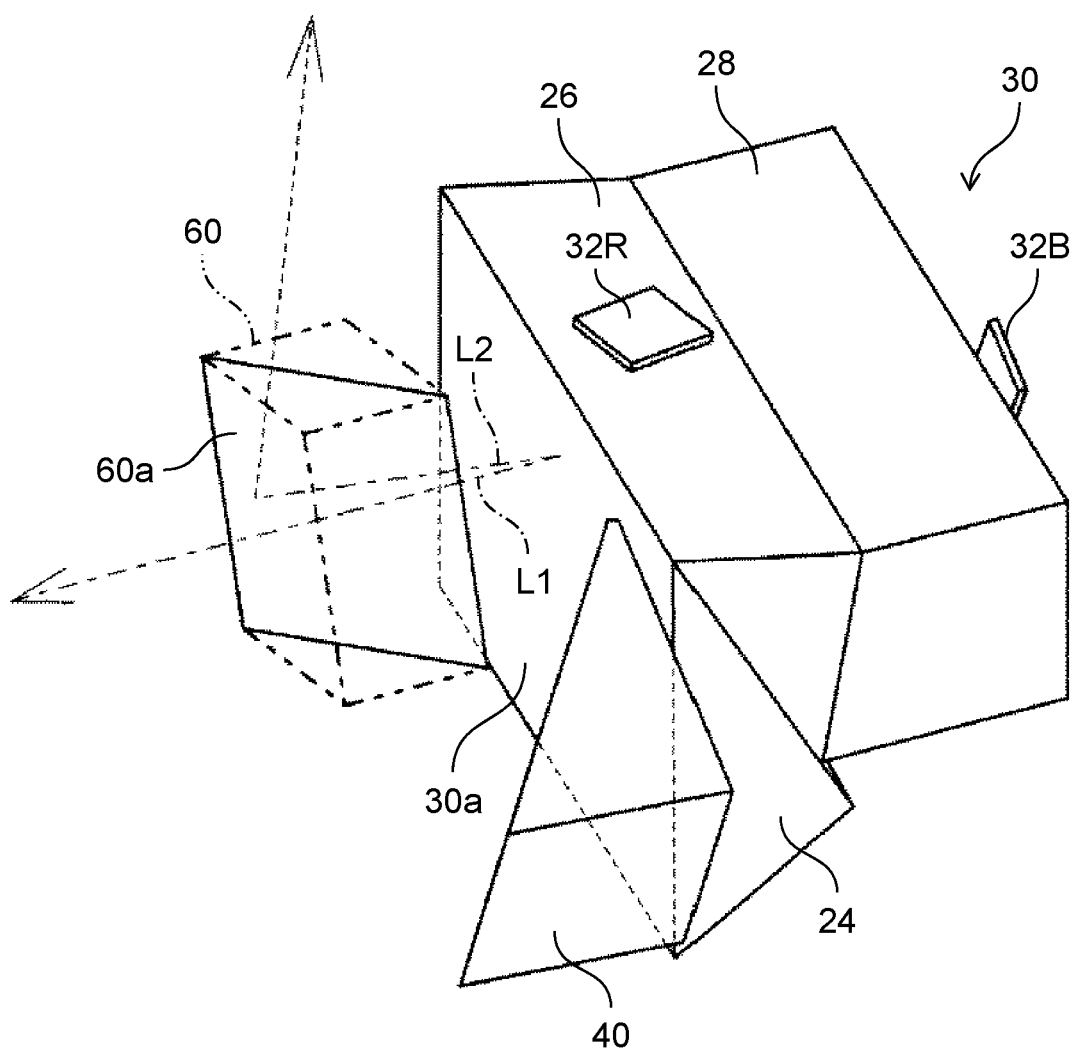
FIG. 6 is a perspective view illustrating a TIR prism and a prism assembly of an image former.
Figure 7A:
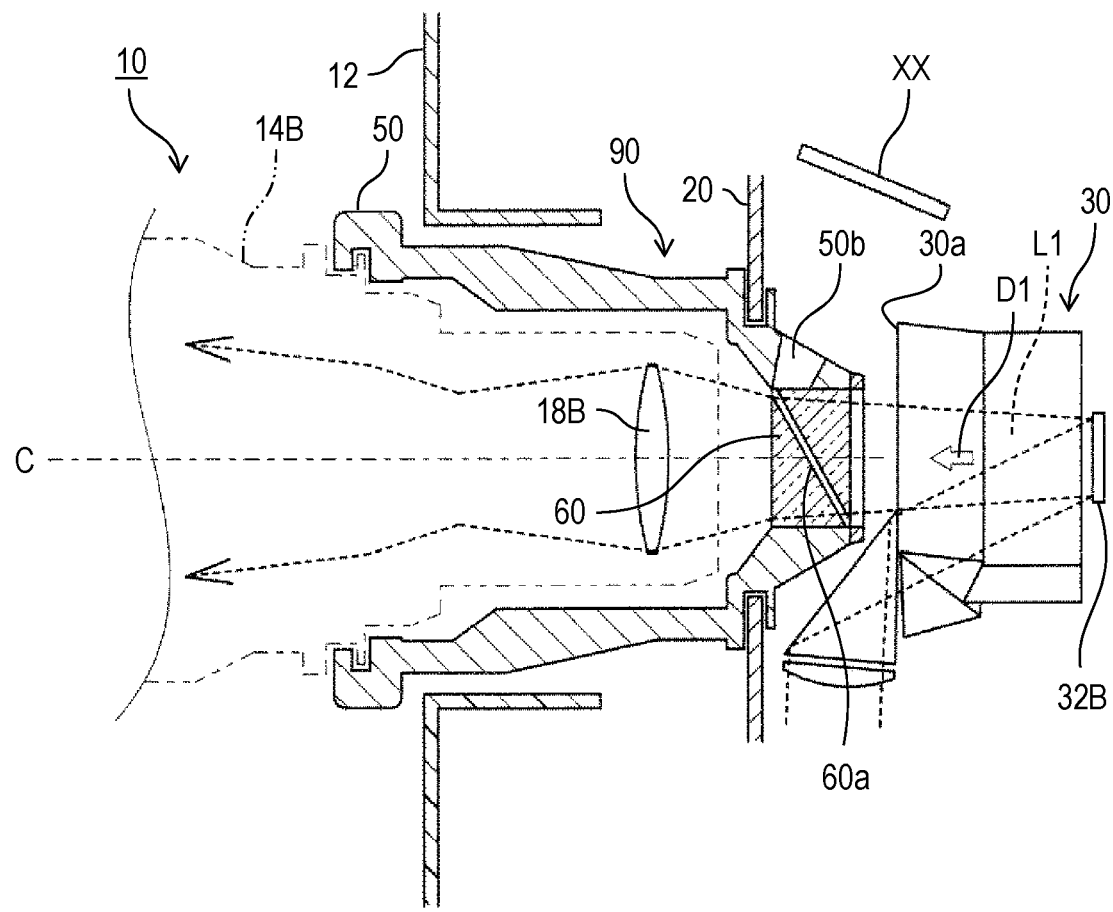
FIG. 7A is a view illustrating a portion of the projector to which the second projection lens unit is connected while the projector is projecting image light.
Figure 7B:
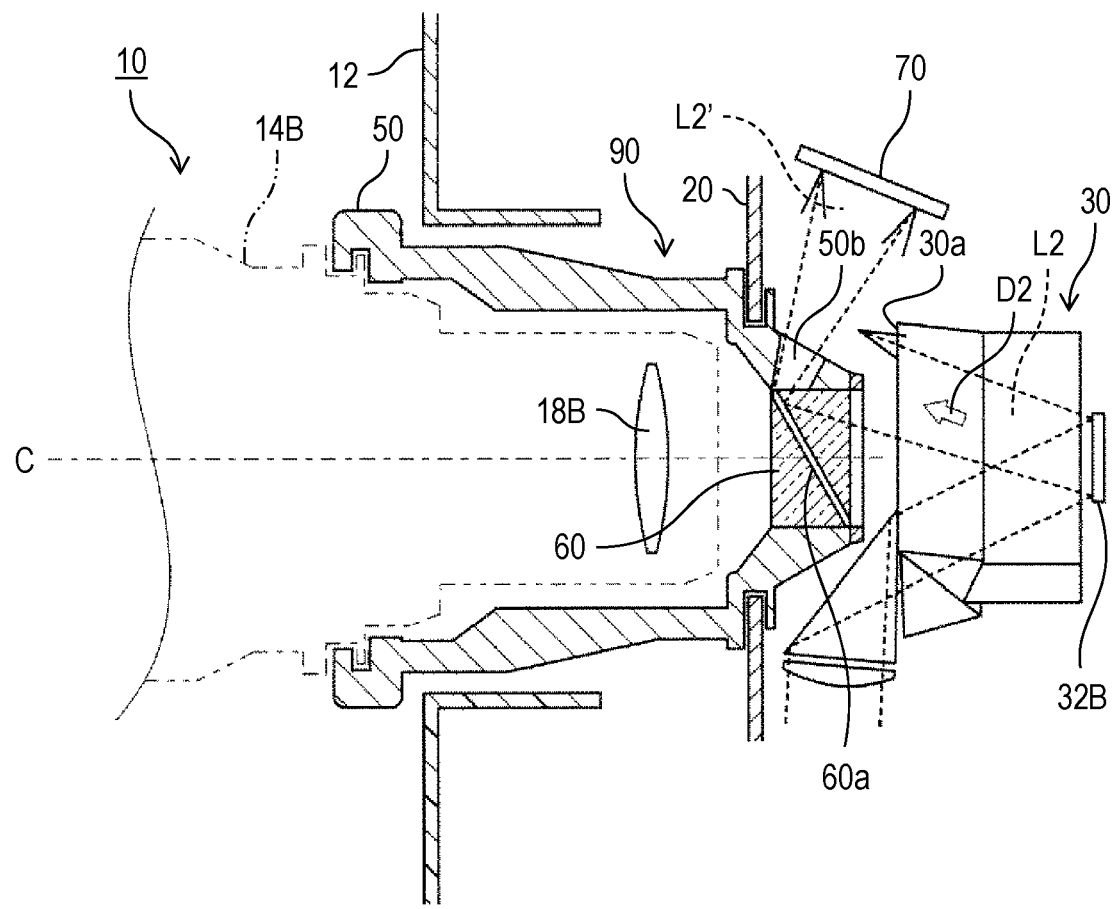
FIG. 7B is a view illustrating a portion of the projector to which the second projection lens unit is connected while the projector is suspending projection of image light.
Figure 8:
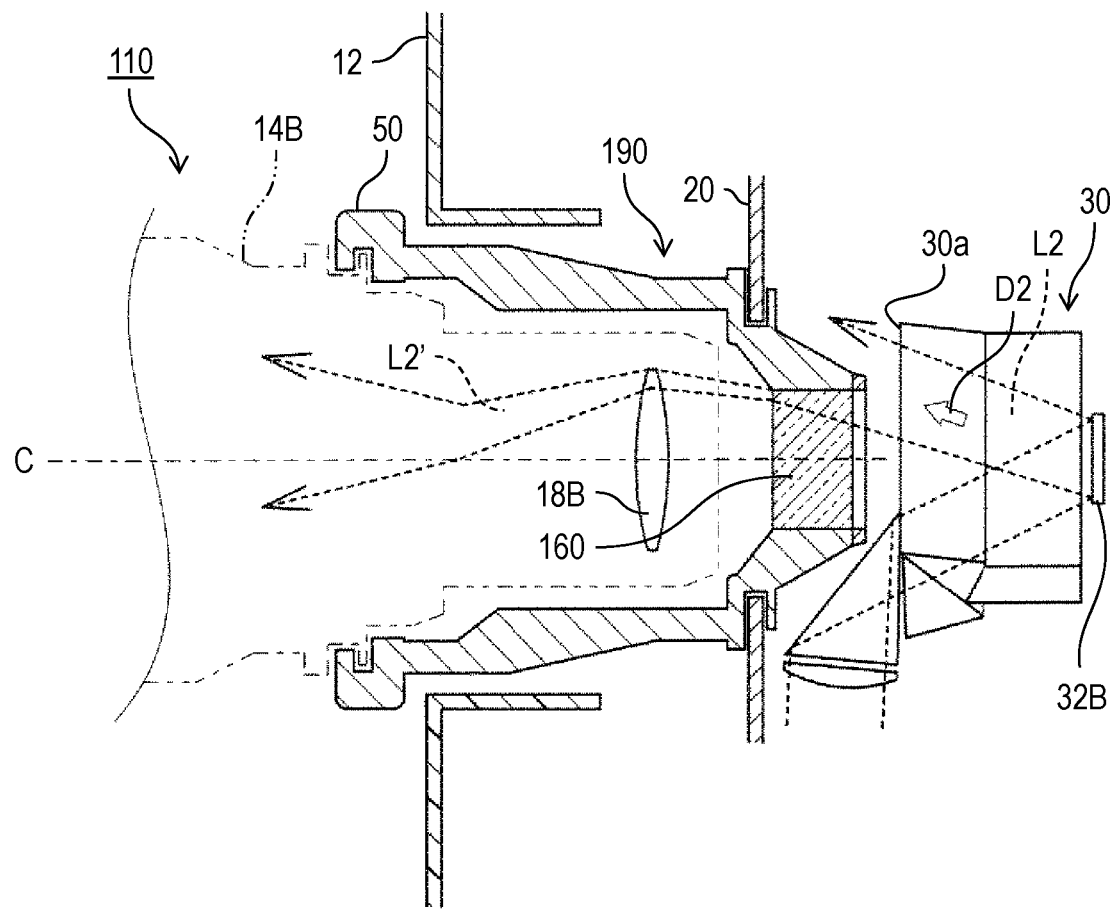
FIG. 8 is a view illustrating a portion of the projector to which the second projection lens unit is connected while a projector of a comparative example is suspending projection of image light.

FIG. 6 is a perspective view illustrating a TIR prism and a prism assembly of the image former. FIG. 7A is a view illustrating a portion of the projector to which the second projection lens unit is connected, while the projector is projecting image light. FIG. 7B is a view illustrating a portion of the projector to which the second projection lens unit is connected, while the projector suspends projection of image light. FIG. 8 is a view illustrating a portion of the projector to which the second projection lens unit is connected, while the projector is suspending projection of image light.

As illustrated in FIG. 6, back focal length-adjusting spacer 60, that is, the TIR prism includes reflection surface 60a that reflects the light that is incident thereon at an angle greater than a predetermined angle. In the case of the present first exemplary embodiment, reflection surface 60a is a slant surface of a triangular prism that is closer to second projection lens 18B.

As described previously, and also as illustrated in FIGS. 7A and 7B, digital micromirror device 32B is a device including a plurality of micromirrors that selectively reflect light in first direction D1 or in second direction D2.

As illustrated in FIG. 7A, when the plurality of micromirrors of digital micromirror device 32B reflect light in first direction D1, the reflected light L1 is emitted from emission surface 30a of prism assembly 30 toward second projection lens 18B of second projection lens unit 14B. As illustrated in FIG. 6, reflected light L1 that emanates from emission surface 30a enters back focal length-adjusting spacer 60 and transmits through reflection surface 60a without being reflected. Then, reflected light L1 enters second projection lens 18B of second projection lens unit 14B, and is finally projected from second projection lens unit 14B onto a screen.

On the other hand, as illustrated in FIG. 7B, during the time that projector 10 is suspending projection of image light (while illumination light source unit 22 is emitting light), the plurality of micromirrors of digital micromirror device 32B reflect light in second direction D2. A large part of reflected light L2 does not enter adapter 50, in other words, does not reach back focal length-adjusting spacer 60. However, a remaining part of reflected light L2 (i.e., remaining light L2') enters adapter 50.

This remaining light L2' of reflected light L2 that has entered adapter 50 is reflected by reflection surface 60*a* of back focal length-adjusting spacer 60 in a direction such that it does not enter second projection lens 18B of second projection lens unit 14B. Remaining light L2' reflected by reflection surface 60*a* proceeds out of adapter 50 via through hole 50*b* formed in adapter 50, and is absorbed by absorber 70 (i.e., converted into heat).

In order to better understand the advantageous effect of reflection surface 60*a*, the following describes a case in which the back focal length-adjusting spacer does not have the reflection surface.

As illustrated in FIG. 8, in projector 110 of a comparative example, back focal length-adjusting spacer 160 of adapter unit 190 is not a TIR prism but a glass plate. In this case, remaining light L2' of reflected light L2 that has been reflected by digital micromirror device 32B and has entered adapter 50 of adapter unit 190 transmits through back focal length-adjusting spacer 160. Then, the transmitting remaining light L2' enters second projection lens 18B of second projection lens unit 14B. As a consequence, although projector 110 is suspending projection of image light, remaining light L2' is projected onto the screen. Moreover, the temperature of the inside of second projection lens unit 14B rises because of remaining light L2', so the optical properties of second projection lens unit 14B may change and focus variations may occur, for example.

In view of this, when, as illustrated in FIG. 7B, back focal length-adjusting spacer 60 is provided with reflection surface 60*a*, remaining light L2' of reflected light L2 that has undesirably entered adapter 50 can be prevented from entering second projection lens 18B of second projection lens unit 14B.

It should be noted that, although digital micromirror device 32B has been taken as an example herein, reflection surface 60*a* of back focal length-adjusting spacer 60 also brings the same effect also for the reflected light by the other digital micromirror devices 32R and 32G.

In addition, as illustrated in FIG. 3, in cases where first projection lens unit 14A is mounted to projector 10, the light from illumination light source unit 22 does not enter first projection lens 18A of first projection lens unit 14A while projector 10 is suspending projection of image light. That is, because projector 10 is optically designed for first projection lens unit 14A, the light reflected by each of digital micromirror devices 32R, 32G, and 32B is not allowed to enter first projection lens 18A of first projection lens unit 14A.

Furthermore, when second projection lens unit 14B includes a projection optical system such that at least a portion of reflected light L2 reflected by each of digital micromirror devices 32R, 32G, and 32B in second direction D2 does not enter second projection lens 18B, the back focal length-adjusting spacer provided in adapter 50 may be a glass plate that does not include a reflection surface. That is, the back focal length-adjusting spacer may function only for the purpose of adjusting the back focal length of second projection lens 18B.

The present first exemplary embodiment as described above enables projection lens units having different back focal lengths to be usable in a projector in which a projection lens is interchangeable.

Second Exemplary Embodiment

A second exemplary embodiment is different in the back focal length-adjusting spacer from the foregoing first exemplary embodiment. Therefore, the second exemplary embodiment will be described primarily with regard to this difference. It should be noted the same elements in the present second exemplary embodiment as those in the foregoing first exemplary embodiment are designated by the same reference signs.

Figure 9:
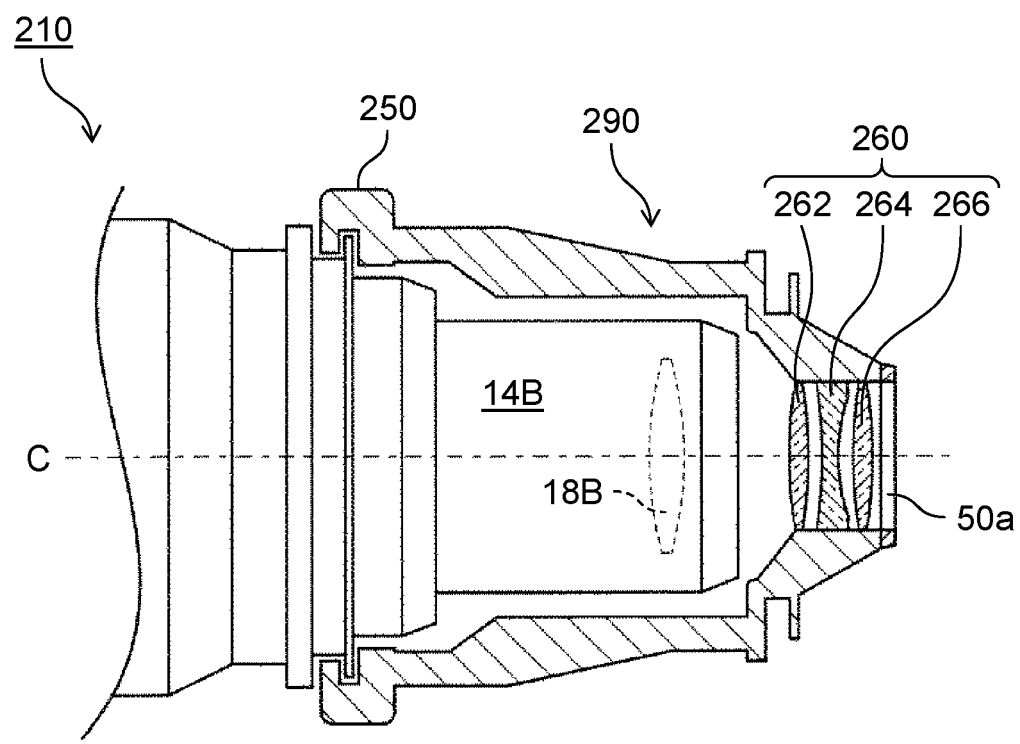
FIG. 9 is a cross-sectional view illustrating an adapter unit of a projector according to a second exemplary embodiment of the present disclosure.

FIG. 9 is a cross-sectional view illustrating an adapter unit of a projector according to the second exemplary embodiment of the present disclosure.

As illustrated in FIG. 9, in projector 210 according to the present second exemplary embodiment, adapter 250 is provided with back focal length-adjusting spacer 260 for adjusting the back focal length of second projection lens 18B of second projection lens unit 14B. Adapter 250 and back focal length-adjusting spacer 260 together constitute adapter unit 290. In the case of the present second exemplary embodiment, back focal length-adjusting spacer 260 includes a plurality of lenses 262, 264, and 266 (a group of lenses). Note that each of lenses 262, 264, and 266 may be a spherical lens or an aspherical lens, for example. Alternatively, back focal length-adjusting spacer 260 may consist of a single lens.

The present first exemplary embodiment as described above enables projection lens units having different back focal lengths to be usable in a projector in which a projection lens unit is interchangeable.

Third Exemplary Embodiment

A third exemplary embodiment is different in the second projection lens unit from the foregoing first exemplary embodiment. Therefore, the third exemplary embodiment will be described primarily with regard to this difference. It should be noted the same elements in the present third exemplary embodiment as those in the foregoing first exemplary embodiment are designated by the same reference signs.

Figure 10:
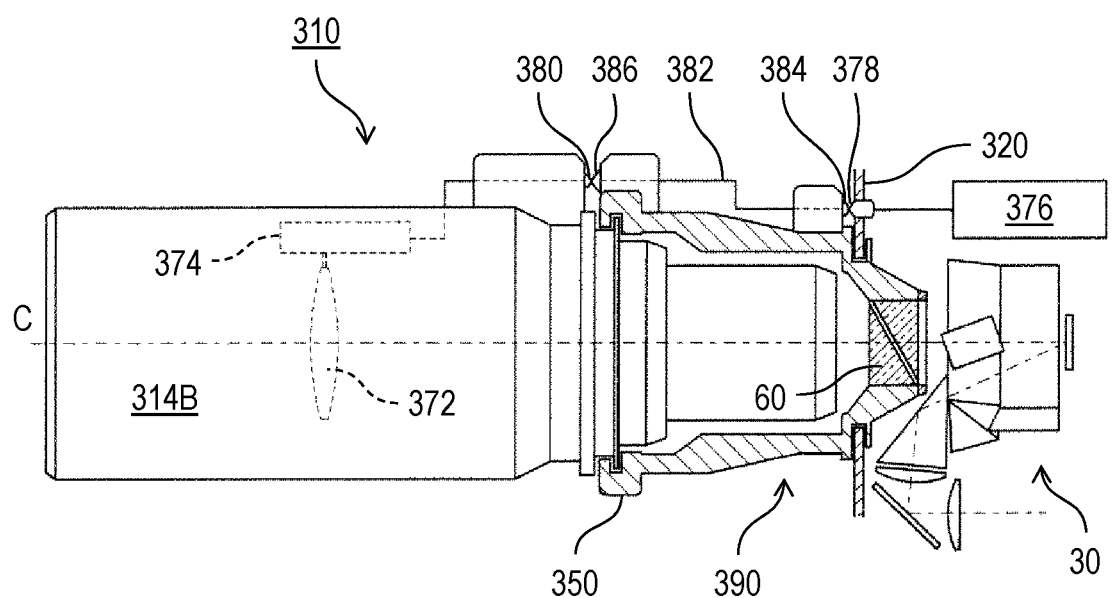
FIG. 10 is a view illustrating a portion of a projector according to a third exemplary embodiment, to which the second projection lens unit is connected.

FIG. 10 is a view illustrating a portion of a projector according to the present third exemplary embodiment, to which the second projection lens unit is connected.

As illustrated in FIG. 10, in projector 310 according to the present third exemplary embodiment, second projection lens unit 314B includes zoom lens 372 that is movable along an extending direction of its optical axis C. Zoom lens 372 is moved by actuator 374 such as a motor. Actuator 374 is controlled by controller device 376 (for example, a CPU) mounted in a housing.

In order to electrically connect actuator 374 and controller device 376 to each other, mounter 320 is provided with electrical contact 378 and second projection lens unit 314B is provided with electrical contact 380. Electrical contact 378 is connected to controller device 376, while electrical contact 380 is connected to actuator 374.

Adapter unit 390 includes adapter 350 and back focal length-adjusting spacer 60. In order to electrically connect electrical contact 378 of mounter 320 and electrical contact 380 of second projection lens unit 314B to each other, adapter 350 includes conductor 382, which may be a conductive wire. One end of conductor 382 is provided with electrical contact 384 that is contactable with electrical contact 378 of mounter 320, and the other end of conductor 382 is provided with electrical contact 386 that is contactable with electrical contact 380 of second projection lens unit 314B.

Adapter 350 retains second projection lens unit 314B, whereby electrical contact 380 and electrical contact 386 are electrically connected to each other. Adapter 350 in that state is connected to mounter 320, whereby electrical contact 384 and electrical contact 378 are electrically connected to each other. As a result, actuator 374 and controller device 376 are electrically connected to each other.

The third exemplary embodiment as just described, as well as in the foregoing first exemplary embodiment, enables projection lens units having different back focal lengths to be usable in a projector in which a projection lens unit is interchangeable.

Fourth Exemplary Embodiment

A fourth exemplary embodiment is different in the adapter from the foregoing first exemplary embodiment. Therefore, the fourth exemplary embodiment will be described primarily with regard to this difference. It should be noted the same elements in the present fourth exemplary embodiment as those in the foregoing first exemplary embodiment are designated by the same reference signs.

Figure 11:
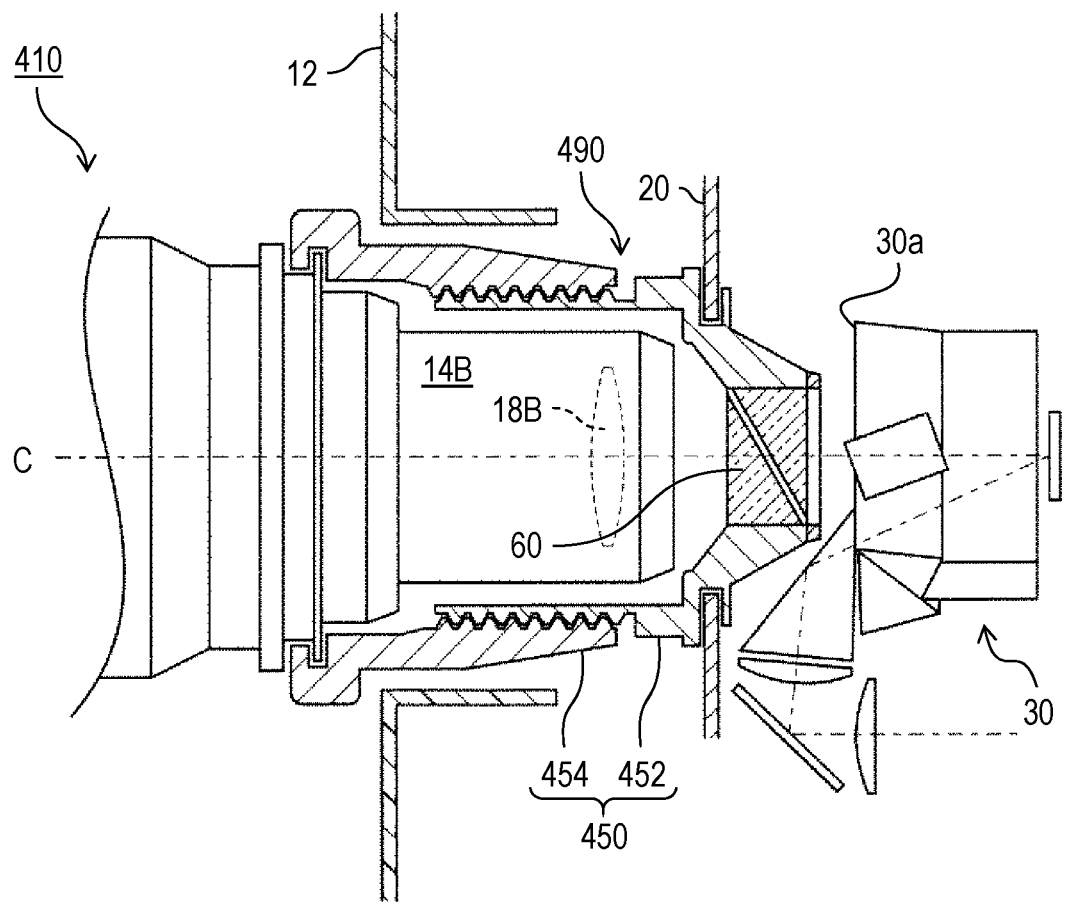
FIG. 11 is a view illustrating a portion of a projector according to a fourth exemplary embodiment of the present disclosure, to which the second projection lens unit is connected.

FIG. 11 is a view illustrating a portion of a projector according to the fourth exemplary embodiment of the present disclosure, to which the second projection lens unit is connected.

As illustrated in FIG. 11, in projector 410 according to the present fourth exemplary embodiment, adapter 450 includes base 452 that is connectable to mounter 20 and lens unit holder 454 that retains second projection lens unit 14B. Base 452 is provided with back focal length-adjusting spacer 60. Adapter 450 and back focal length-adjusting spacer 60 together constitute adapter unit 490.

In adapter 450, lens unit holder 454 is connected so as to be movable back and forth relative to base 452 along a direction of projection (an extending direction of optical axis C) of second projection lens unit 14B. For that purpose, a male screw portion is formed on the outer peripheral surface of base 452, and a female threaded portion that engages with the male screw portion is formed in the inner peripheral surface of lens unit holder 454.

Lens unit holder 454 moves back and forth relative to the base along the direction of projection of second projection lens unit 14B so that the distance between second projection lens 18B of second projection lens unit 14B and emission surface 30a of image former 16 can be adjusted. As a result, focus adjustment of projected image is made possible.

The fourth exemplary embodiment as just described, as well as in the foregoing first exemplary embodiment, enables projection lens units having different back focal lengths to be usable in a projector in which a projection lens unit is interchangeable.

Other Exemplary Embodiments

Thus, the first to fourth exemplary embodiments have been described to illustrate the present disclosure. However, the present disclosure is not limited to the exemplary embodiments described hereinabove.

For example, although each of projectors 10, 210, 310, and 410 in the foregoing first to fourth exemplary embodiments is a so-called DLP type projector, the embodiments of the present disclosure are not limited thereto.

Figure 12:
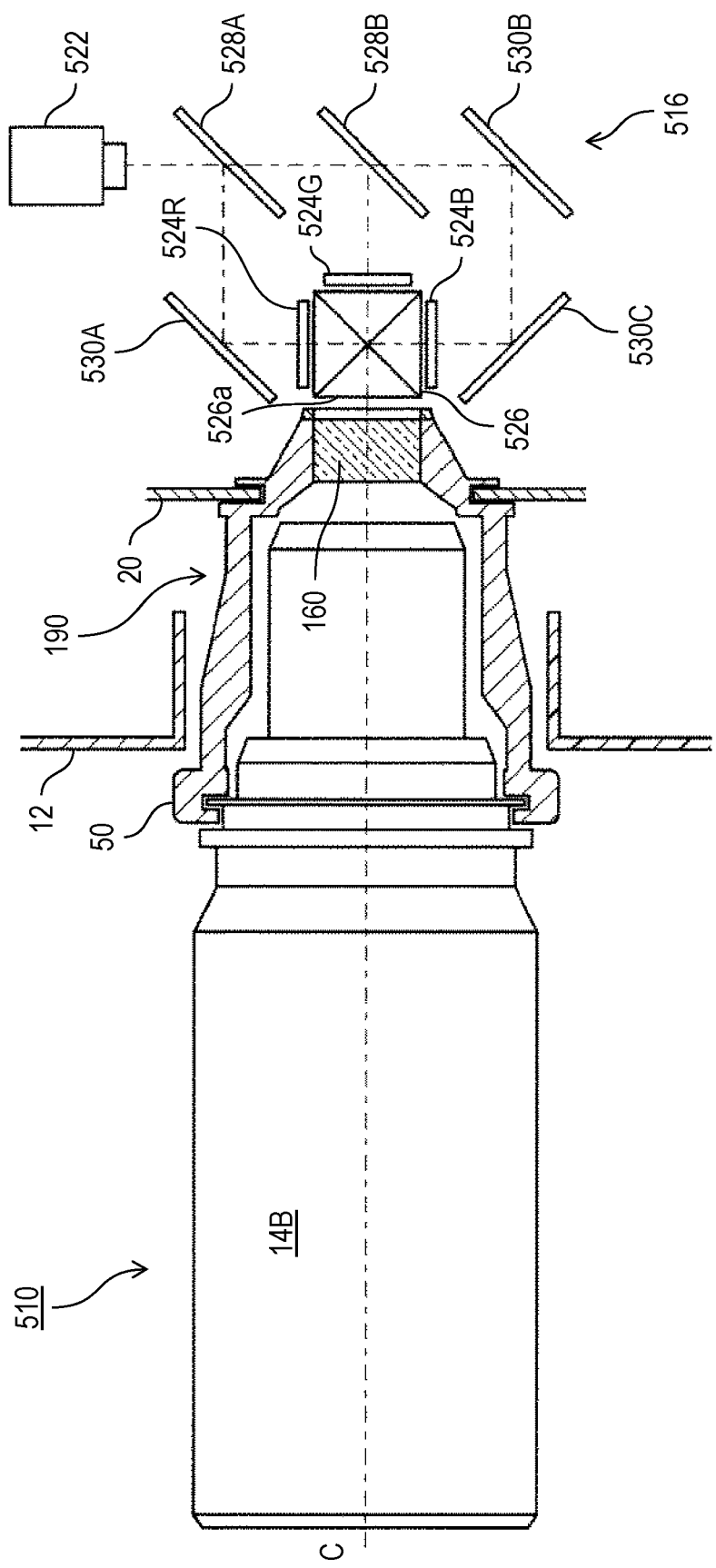
FIG. 12 is a view illustrating a portion of a projector according to another exemplary embodiment of the present disclosure, to which the second projection lens unit is connected.

FIG. 12 is a view illustrating a portion of a projector according to another exemplary embodiment of the present disclosure, to which the second projection lens unit is connected.

As illustrated in FIG. 12, projector 510 according to another exemplary embodiment is not the DLP type but a 3 LCD (Liquid Crystal Display) type projector.

Image former 516 of the 3 LCD type projector 510 includes illumination light source unit 522, transmissive liquid crystal panels 524R, 524G, and 524B, prism 526, dichroic mirrors 528A and 528B, and a plurality of mirrors 530A to 530C.

The light emitted from illumination light source unit 522 is split into three light components by dichroic mirrors 528A and 528B. The light reflected by dichroic mirror 528A is reflected by mirror 530A and is passed through liquid crystal panel 524R for red color. The light passed through dichroic mirror 528A and reflected by dichroic mirror 528B is passed through liquid crystal panel 524G for green color. Then, the light passed through dichroic mirror 528B is reflected by mirror 530B and mirror 530C and is passed through liquid crystal panel 524B for blue color. The red, green, and blue light components (image light) that have passed through the three liquid crystal panels 524R, 524G, and 524B respectively are combined in prism 526. The combined light (image light) is emitted from emission surface 526a of prism 526 toward second projection lens unit 14B (or toward first projection lens unit 14A).

In addition, in the case of the foregoing first exemplary embodiment, back focal length-adjusting spacer 60 is an optical element. However, the embodiments of the present disclosure are not limited thereto. The back focal length-adjusting spacer may be a void space.

Hereinabove, the exemplary embodiments have been described as examples of the technology of the present disclosure. The appended drawings and the detailed description are provided for that purpose. Accordingly, the elements shown in the appended drawings and the detailed description may include not only the elements that are essential to solve the technical problem but also the elements that merely illustrate examples of the technology and are not necessarily essential to solve the technical problem. Therefore, just because the appended drawings and the detailed description contain such non-essential elements, it should not be construed that such non-essential elements are necessary.

Moreover, the foregoing exemplary embodiments merely illustrate the technology of the present disclosure; therefore, various modifications, substitutions, additions, and subtractions may be made within the scope of the claims and equivalents thereof.

INDUSTRIAL APPLICABILITY

The present disclosure is applicable to a projector in which a projection lens is interchangeable.

What is claimed is:

1. A projector comprising:
an image former forming and emitting image light;
a mounter detachably connecting to a first projection lens unit including a first projection lens which the image light emitted from the image former enters;
a second projection lens unit including a second projection lens having a back focal length to an emission surface of the image former that is different from a back focal length of the first projection lens;
an adapter being detachably connectable to the mounter and detachably retaining the second projection lens unit; and
a back focal length-adjusting spacer disposed on the adapter and interposed between the second projection lens and the emission surface of the image former when the second projection lens unit is connected to the mounter via the adapter, wherein the back focal length-adjusting spacer includes a total internal reflection prism.

2. The projector according to claim 1, wherein:
the mounter includes an electrical contact;
the second projection lens unit includes an electrical contact; and
the adapter includes a conductor that electrically connects the electrical contact of the mounter and the electrical contact of the second projection lens unit.

3. The projector according to claim 1, wherein:
the adapter includes a base connectable to the mounter and a lens unit holder retaining the second projection lens unit; and
the lens unit holder is connected to the base to be movable back and forth relative to the base along a direction of projection of the second projection lens unit.

4. The projector according to claim 1, wherein:
the image former includes:
a light source; and
a digital micromirror device including a plurality of micromirrors selectively reflecting light from the light source in a first direction or in a second direction; and
the total internal reflection prism includes a reflection surface such that a part of the light reflected by each of the plurality of micromirrors in the first direction is transmitted toward the second projection lens of the second projection lens unit and another part of the light reflected by each of the plurality of micromirrors in the second direction is reflected in a direction such as not to enter the second projection lens of the second projection lens unit.

5. An adapter unit for connecting a second projection lens unit to a projector, the projector including an image former forming and emitting image light and a mounter detachably connecting to a first projection lens unit including a first projection lens which the image light emitted from the image former enters, and the second projection lens unit including a second projection lens having a back focal length to an emission surface of the image former that is different from a back focal length of the first projection lens, the adapter unit comprising:
an adapter being detachably connectable to the mounter and detachably retaining the second projection lens unit; and
a back focal length-adjusting spacer interposed between the second projection lens and the emission surface of the image former when the second projection lens unit is connected to the mounter via the adapter,
wherein the back focal length-adjusting spacer includes a total internal reflection prism.

6. The adapter unit according to claim 5, wherein:
the image former includes:
a light source; and
a digital micromirror device including a plurality of micromirrors selectively reflecting light from the light source in a first direction or in a second direction, and
the total internal reflection prism includes a reflection surface such that a part of the light reflected by each of the plurality of micromirrors in the first direction is transmitted toward the second projection lens of the second projection lens unit and another part of the light reflected by each of the plurality of micromirrors in the second direction is reflected in a direction such as not to enter the second projection lens of the second projection lens unit.

* * * * *